(12) United States Patent
Weber et al.

(10) Patent No.: US 6,180,911 B1
(45) Date of Patent: Jan. 30, 2001

(54) MATERIAL AND GEOMETRY DESIGN TO ENHANCE THE OPERATION OF A PLASMA ARC

(75) Inventors: Peter Weber, Ziefen (CH); Mark W. Shuey, Ukiah, CA (US); Robin A. Lampson, Ukiah, CA (US); Roger S. Brooks, Ukiah, CA (US)

(73) Assignee: Retech Services, Inc., Ukiah, CA (US)

( * ) Notice: Under 35 U.S.C. 154(b), the term of this patent shall be extended for 0 days.

(21) Appl. No.: 09/324,352

(22) Filed: Jun. 2, 1999

(51) Int. Cl.[7] ..................................................... B23K 9/00
(52) U.S. Cl. ..................................... 219/121.5; 219/121.59
(58) Field of Search ........................... 219/121.5, 121.59, 219/121.48, 121.43, 121.52; 373/156; 425/10

(56) References Cited

U.S. PATENT DOCUMENTS

| | | |
|---|---|---|
| 2,874,265 | 2/1959 | Reed et al. . |
| 3,248,874 | 5/1966 | Grina . |
| 3,935,825 | 2/1976 | Matthews et al. . |
| 4,014,296 | 3/1977 | Anstrom . |
| 4,220,843 | 9/1980 | Borer et al. . |
| 4,312,637 | 1/1982 | Loftus . |
| 4,321,877 | 3/1982 | Schmidt et al. . |
| 4,325,842 * | 4/1982 | Adachi et al. ........................... 425/10 |
| 4,549,065 | 10/1985 | Camacho et al. . |
| 4,559,439 | 12/1985 | Camacho et al. . |
| 4,580,032 | 4/1986 | Carkhuff . |
| 4,587,397 | 5/1986 | Camacho et al. . |
| 4,594,496 * | 6/1986 | Bebber et al. ..................... 219/121.5 |
| 4,653,677 | 3/1987 | Peters et al. . |
| 4,745,256 | 5/1988 | Shubert . |
| 4,791,268 | 12/1988 | Sanders et al. . |
| 4,830,280 | 5/1989 | Yankoff . |
| 4,864,096 | 9/1989 | Wolf et al. . |
| 4,912,296 | 3/1990 | Schlienger . |
| 5,017,754 | 5/1991 | Drouet et al. . |
| 5,043,548 * | 8/1991 | Whitney et al. ................. 219/121.47 |
| 5,136,137 * | 8/1992 | Schlienger ....................... 219/121.59 |
| 5,227,603 | 7/1993 | Doolette et al. . |
| 5,301,620 | 4/1994 | Nagel et al. . |
| 5,331,906 | 7/1994 | Sonoda et al. . |
| 5,362,939 | 11/1994 | Hanus et al. . |
| 5,376,767 | 12/1994 | Heanley et al. . |
| 5,408,494 | 4/1995 | Schlienger . |
| 5,416,297 | 5/1995 | Luo et al. . |
| 5,440,094 | 8/1995 | Zapletal . |
| 5,451,738 | 9/1995 | Alvi et al. . |
| 5,451,740 | 9/1995 | Hanus et al. . |
| 5,479,438 * | 12/1995 | Blum et al. .......................... 373/156 |
| 5,484,978 | 1/1996 | Hedberg et al. . |
| 5,548,097 | 8/1996 | Couch, Jr. et al. . |
| 5,548,611 | 8/1996 | Cusick et al. . |
| 5,573,564 | 11/1996 | Richards . |
| 5,601,734 | 2/1997 | Luo et al. . |

\* cited by examiner

*Primary Examiner*—Teresa Walberg
*Assistant Examiner*—Van Quang
(74) *Attorney, Agent, or Firm*—Townsend and Townsend and Crew, LLP

(57) ABSTRACT

A pour throat nozzle for a plasma arc centrifugal treatment system includes a substantially cylindrical throat section, with a generally arch-shaped, downwardly-facing surface at smaller radius extending above the plane of the bottom of the throat section, and with this connecting to a generally cylindrical section extending below the aforesaid plane at an inside radius much larger than the radius of the throat section. Furthermore, a method of reforming an orifice of a pour throat in a PACT system centrifuge includes adding ceramic material to the melt, heating and mixing the ceramic material with the melt, then slowing rotation of the centrifuge so that the mix pours into the inlet orifice of the nozzle.

16 Claims, 6 Drawing Sheets

MATERIAL AND GEOMETRY DESIGN TO ENHANCE THE OPERATION OF A PLASMA ARC

BACKGROUND OF THE INVENTION

1. The Field of the Invention

The present invention relates generally to a pour nozzle for a waste treatment system, and more particularly, to a pour nozzle having a substantially arch-shaped portion, for use with a plasma arc centrifugal treatment system.

2. Description of the Prior Art

The plasma arc centrifugal treatment (PACT) system uses refractory compounds in insulation and containment applications because the PACT system uses a plasma torch as a primary heat source where temperatures in the primary melt chamber of the PACT system may range from 2000 degrees Fahrenheit (1094 degrees Celsius) to 3800 degrees Fahrenheit (2094 degrees Celsius). Refractories are ceramic materials commonly used in the manufacture of metals, glass, chemicals, petroleum products, and the destruction of hazardous and non-hazardous wastes. These materials serve as insulation or containment materials that withstand the harsh, high temperature and corrosive environments of many industrial processes. Refractories are typically composed of silica, alumina, chrome oxide, magnesia, dolomite, graphite, or combinations of these materials.

Materials are fed into the PACT system, melted in the centrifuge, and poured through an orifice, located on the axis of the centrifuge, defined within a nozzle. The pour nozzle can be water-cooled copper or made of ceramic materials. Types of ceramic materials used have included silicon carbide, light-weight porous cement-bonded alumina refractory, alumina rammable and chrome oxide alumina rammable refractory, magnesia-carbon resin-bonded refractory brick, and compression molded clay-bonded coarse grain alumina-chrome oxide refractory. Typically, the pour orifice is either a cylinder or a tapered frustum of a cone that acts as a channel for directing molten material from the centrifuge into a slag mold as can be seen in FIGS. 1, 2.

The nozzle forms a transition point between the molten flowable material and its discharge into a slag mold. When the material consists of a molten inorganic material, it is a viscous fluid that passes through the pour nozzle coating the nozzle walls. The cylindrical portion of long pour nozzles tends to promote slag build-up and throat closure. If this occurs, the plasma torch is brought into a position to impinge the plasma stream on the plugged orifice of the nozzle. When the nozzle consists of a ceramic material, the extreme heat of the plasma stream may rapidly erode the nozzle and decrease its operational life. Thus, it can be seen that the cylindrical and tapered ceramic nozzle designs are usually high maintenance items causing a significant amount of down-time for plant operations.

SUMMARY OF THE INVENTION

In accordance with one aspect of the present invention, a pour nozzle between a centrifuge and a slag mold comprises a substantially cylindrical section defining an orifice, and a substantially arch-shaped section extending radially outward and above the bottom end of the orifice section.

In accordance with another aspect of the present invention, the ratio of the height of the nozzle to the diameter of the orifice is between one-half and two.

Accordingly, the present invention provides a design for a pour throat nozzle for use with a PACT system in which the outer part of the nozzle extends below the orifice, and in which the upward slope, when proceeding radially outward from the orifice, prevents materials from flowing along the surface at increasing radii, which would cause buildup and eventual plugging.

By using appropriate high density alumina and chrome oxide refractories, the nozzle is provided with a high temperature and corrosion resistant surface to thereby help increase the operational life of the throat.

Furthermore, another aspect of the present invention is to reform the inlet section of the nozzle by adjusting operating conditions to solidify refractory material in eroded sections of the exposed nozzle surface, thus allowing the operational life of the pour nozzle to be extended even further.

Other features and advantages of the present invention will be understood upon reading and understanding the detailed description of the preferred exemplary embodiments, found herein below, in conjunction with reference to the drawings, in which like numerals represent like elements.

DETAILED DESCRIPTION OF THE PREFERRED EXEMPLARY EMBODIMENTS

Figure 1:
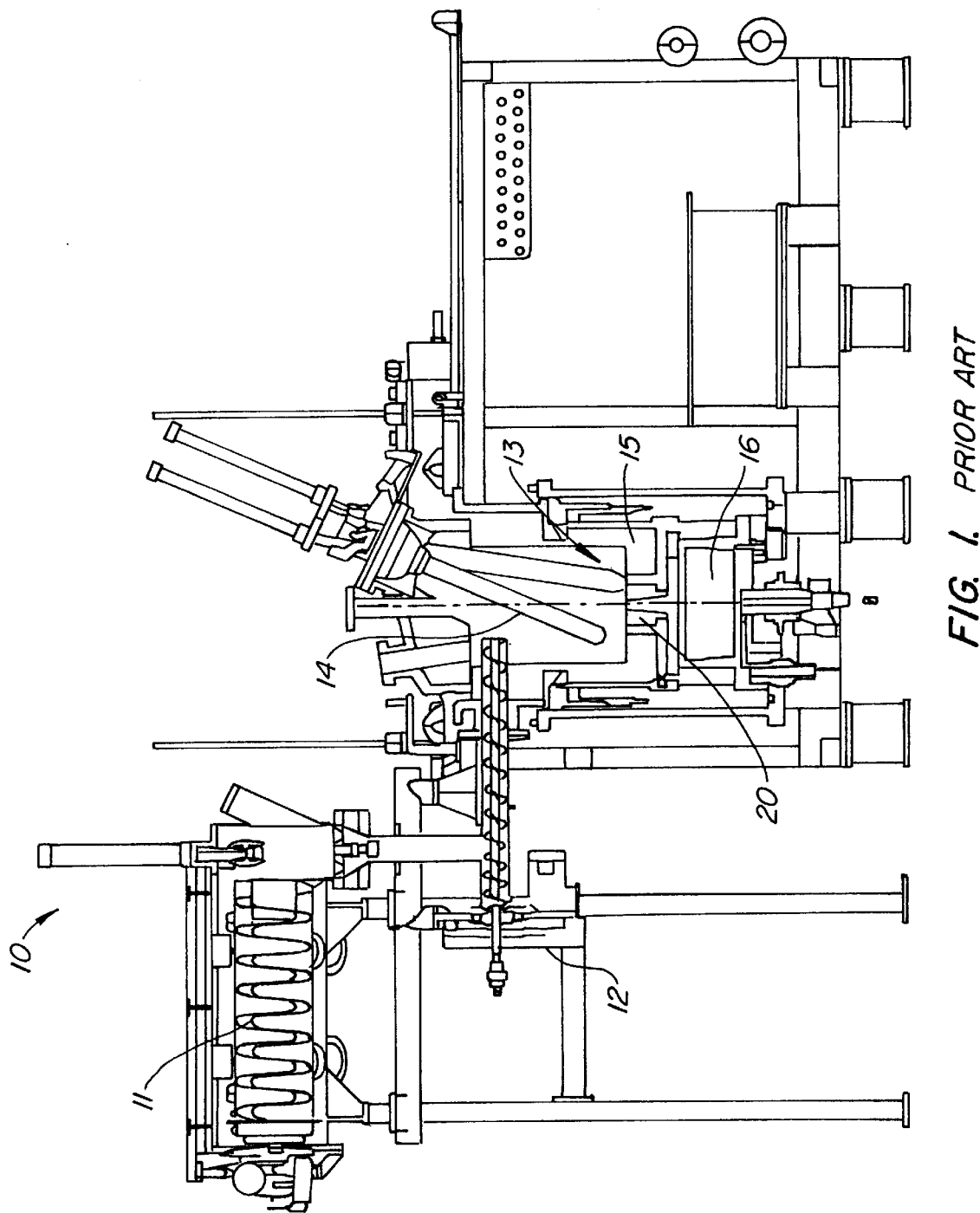
FIG. 1 is a sectional elevation of a plasma arc centrifugal treatment system.

With reference to FIG. 1, a plasma arc centrifugal treatment (PACT) system 10 is illustrated. PACT system 10 includes a main feeder 11, an auger feeder 12, a primary chamber 13, and a plasma torch 14. PACT system 10 further includes a centrifuge 15 and a slag mold 16. Such a PACT system is standard and well known in the art. Examples of PACT systems 10 are disclosed in U.S. Pat. Nos. 4,770,109; 5,005,494; 5,136,137; and 5,408,494, which are hereby incorporated by reference in their entirety for all purposes.

Figure 6A:
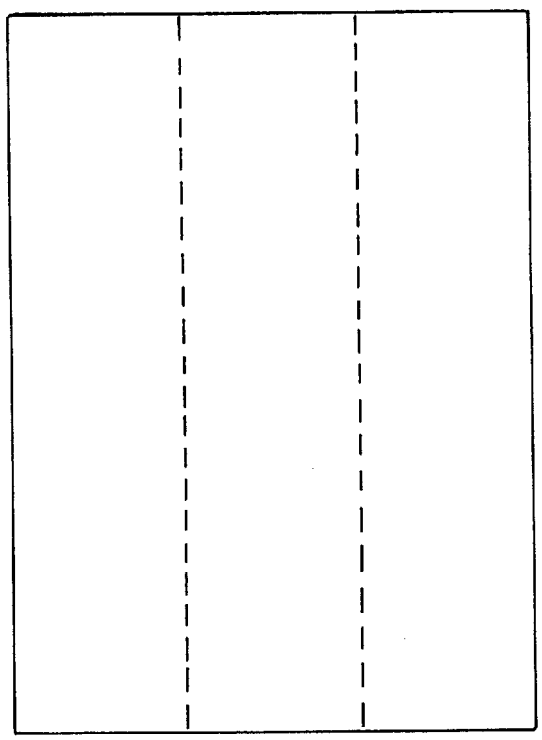
FIGS. 6A and 6B are schematic illustrations of prior art pour nozzle designs.
Figure 6B:
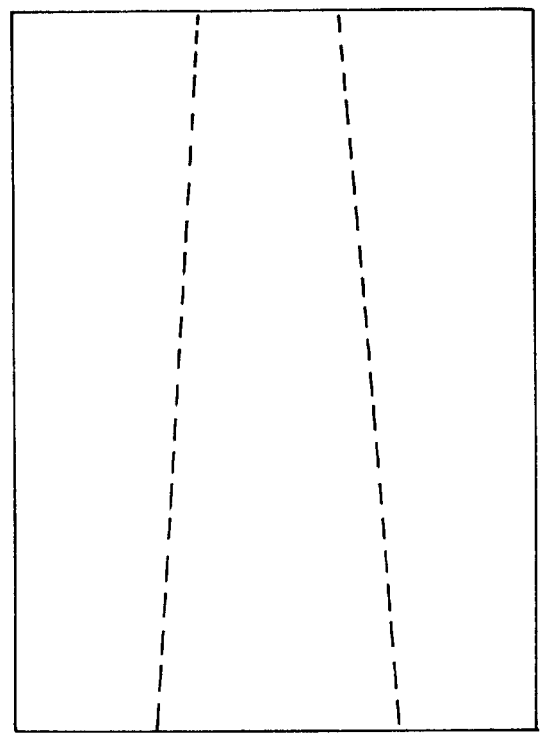

A pour nozzle 20 is mounted within a bottom wall of centrifuge 15 to thereby allow for the transfer of molten slag from the centrifuge into slag mold 16 therethrough. As can be seen in FIGS. 6A and 6B, prior art designs for a nozzle orifice include a substantially cylindrical shape and a tapered or frusto-conical shape.

Figure 2A:
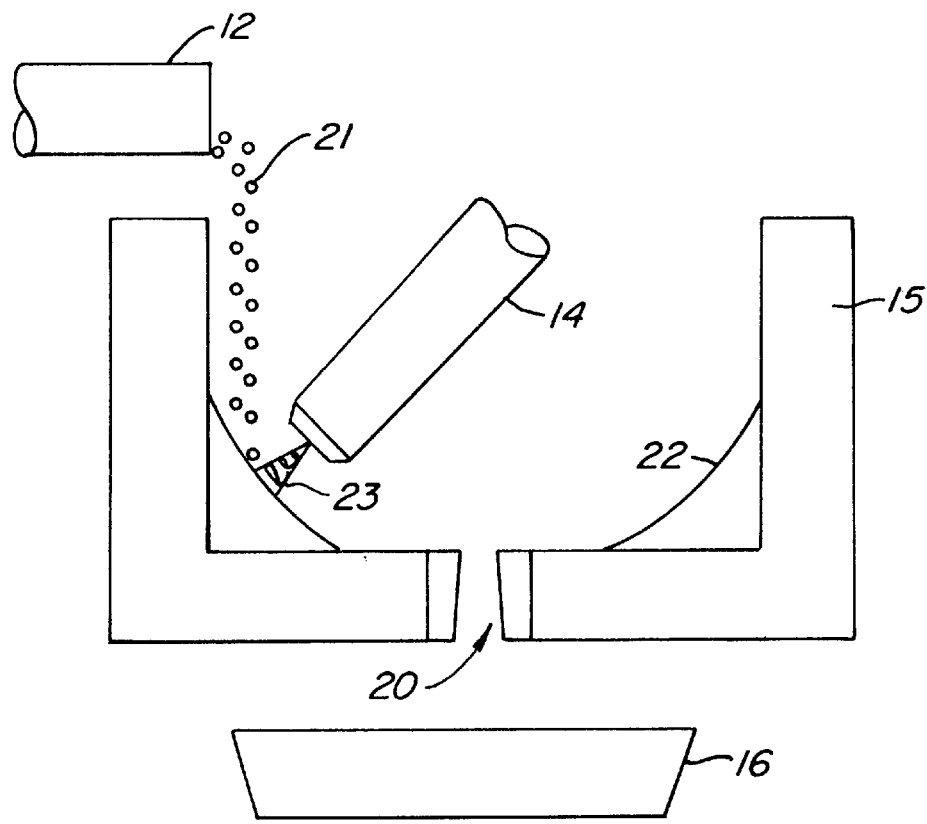
FIGS. 2A and 2B are schematic views of a PACT centrifuge illustrating materials processing and slag pouring with prior art pour nozzle.
Figure 2B:
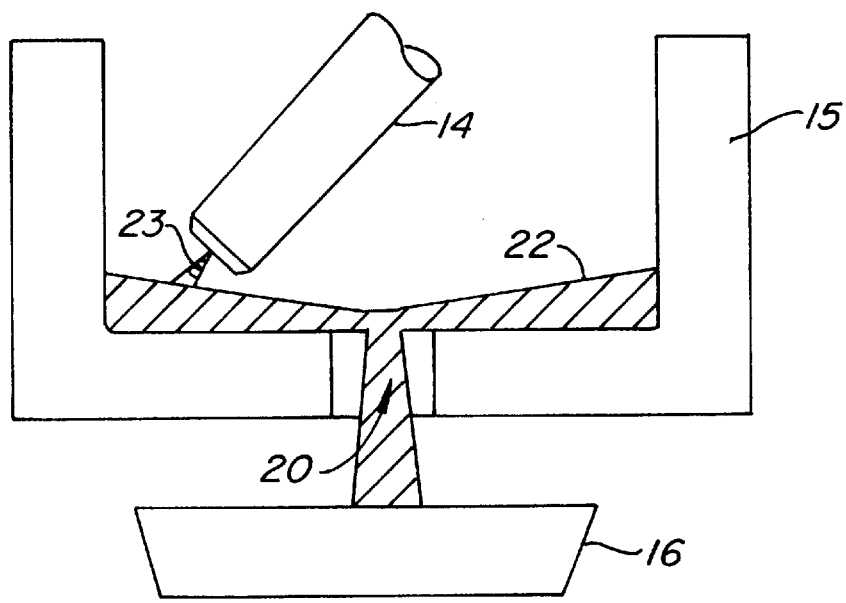

FIGS. 2A and 2B schematically illustrate operation of PACT system 10 with a prior art nozzle having a tapered orifice 20. Auger feeder 12 supplies feed material 21 (received from main feeder 11) to the surface of molten material 22 that is being treated. A plasma stream 23 is produced by plasma torch 14 on the feed material 21 and molten material 22 thus heating the two materials so that they are in a pourable state. During operation of PACT system 10, centrifuge 15 rotates.

After the heated feed material and molten material become pourable, the materials are discharged in a stream 24 into slag mold 16 by slowing the rotation of centrifuge 15. As noted above, the design of pour nozzle 20 in the prior art, i.e., the cylindrical and tapered cylindrical designs illustrated in FIGS. 6A and 6B respectively, promote slag build-up and throat closure.

Figure 3:
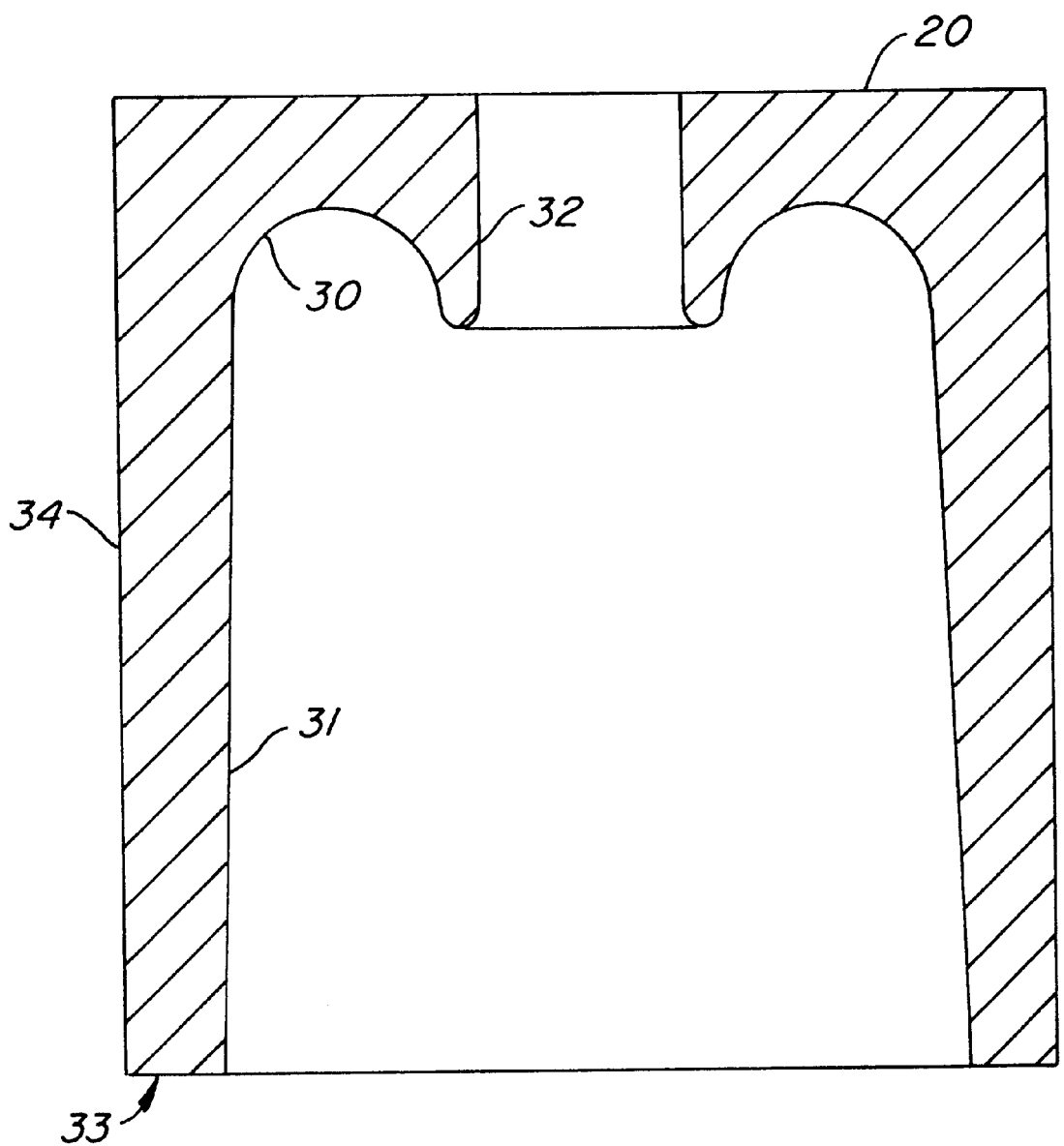
FIG. 3 is a schematic view of a pour nozzle in accordance with the present invention.

FIG. 3 illustrates one embodiment of a design of a pour throat nozzle 20 in accordance with the present invention. Such a nozzle 20 includes an arch profile 30, a lower section inside wall 31, a lower section outer wall 34, and an orifice 32. As an example of dimensions for nozzle 20, orifice 32 has a height of 3.5 inches and a diameter of 4 inches. The overall height H of the nozzle is 21 inches and the lower part of the nozzle has an inside diameter of 15 inches and an outside diameter of 18 inches. The arch height above the bottom of inlet orifice 32 is 1.5 inches. Nozzle 20 is preferably circular in axial cross-section throughout its various portions.

Figure 4:
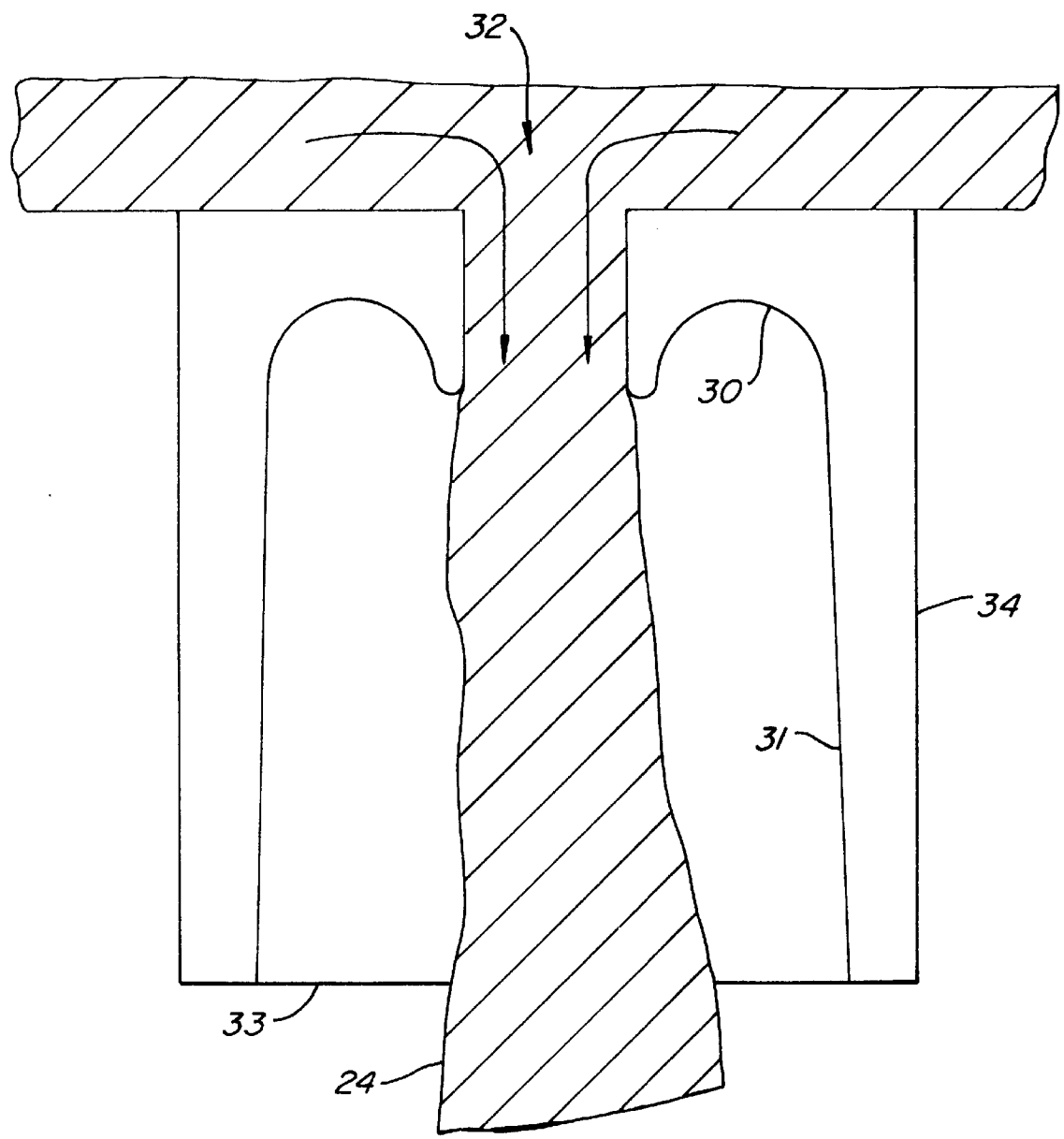
FIG. 4 is a schematic view of the pour nozzle illustrated in FIG. 3 illustrating material passing therethrough.

FIG. 4 illustrates nozzle 20 in use. As can be seen, discharge stream 24 does not contact arch profile 30 as discharge stream 24 passes therethrough. Thus, nozzle 20 aids in preventing slag build-up and throat closure.

Figure 5:
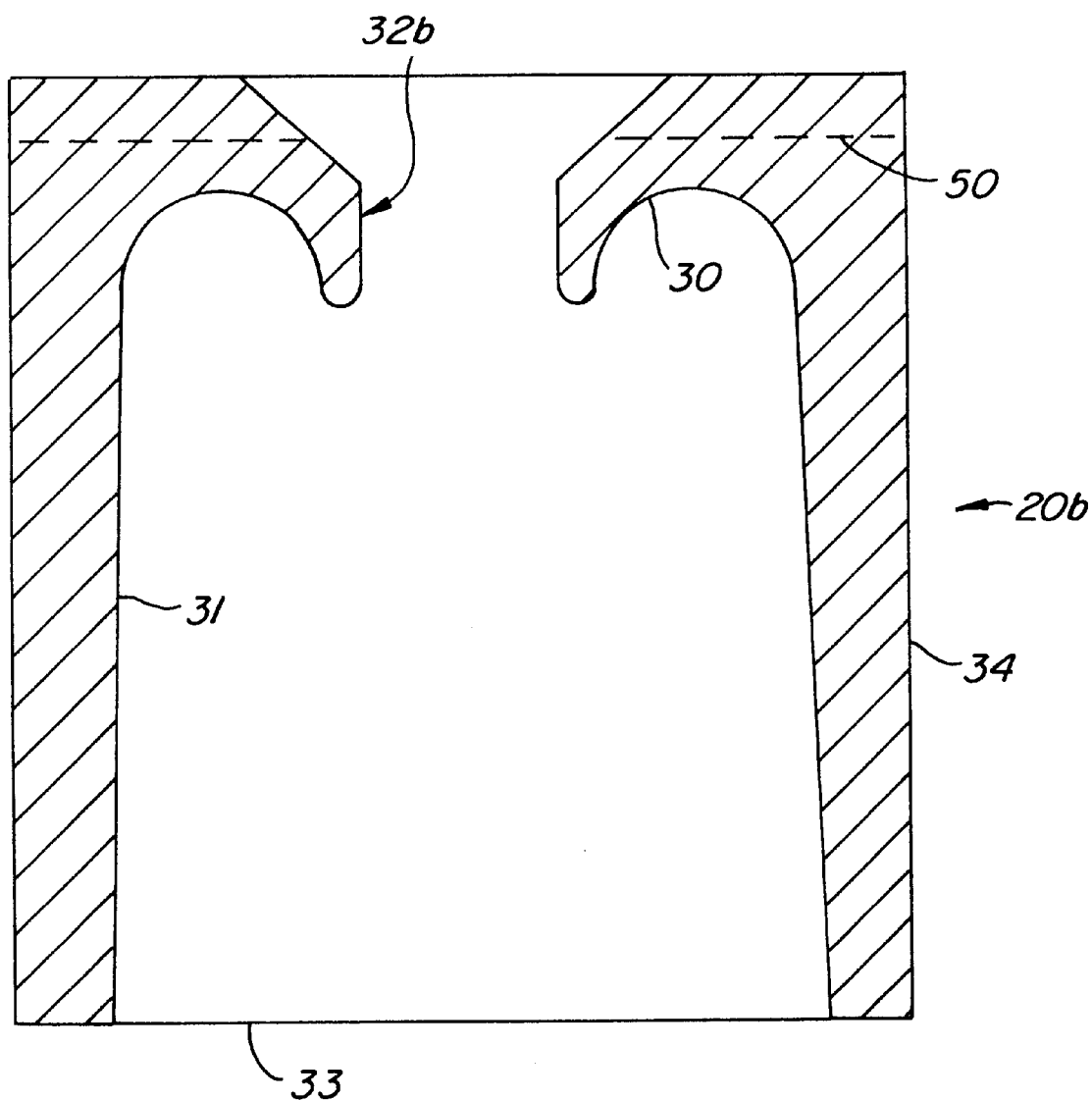
FIG. 5 is a schematic view with an additional feature of a pour nozzle in accordance with the present invention.

FIG. 5 illustrates yet another embodiment of a pour throat nozzle 20b in accordance with the present invention. Nozzle 20b is similar to nozzle 20. Nozzle 20b, however, includes an orifice 32b that is substantially conical. Furthermore, nozzle 20 includes a groove 50 defined from outer wall 34 to inlet orifice 32b. Groove 50 helps direct the treated, molten material to orifice 32b. Groove 50 is defined within nozzle 20b during manufacture of nozzle 20b as opposed to allowing the treated material to melt its own groove within the nozzle, thus damaging the nozzle. Nozzle 20b helps further reduce closure by providing the treated material a constant path for movement from the centrifuge to the orifice.

In accordance with another aspect of the present invention, processed, molten slag is used to reform any erosion of inlet orifice 32 caused by the heat. Inlet orifice 32 of nozzle 20 may erode over time. This is a major cause of failure for the nozzles.

According to such a method, during operation the centrifuge is slowed, preferably to approximately 20 revolutions per minute (r.p.m.) and plasma torch 14 is turned off. Centrifuge 15 is then slowed to preferably 5 r.p.m. This allows for the processed molten slag to fill in any eroded areas at inlet orifice 32. It also may seal the inlet orifice of nozzle 20, in which case plasma torch 14 can be used to reopen the throat, using either non-transferred or transferred mode. Transferred, non-transferred and dual mode operations are discussed in the present Assignee's co-pending application, Ser. No. 09/140,492.

The method may also include modifying the processed molten slag with higher alumina melting materials such as introduced by auger feeder 12. The plasma torch 14 is then used to ceramically alloy the added refractory with the processed molten slag. The centrifuge is then slowed, once again preferably to approximately 20 r.p.m. and plasma torch 14 is turned off. The centrifuge is then further slowed, preferably to approximately 5 r.p.m., and the material is allowed to fill in the eroded area. If sealed inlet orifice 32 is then reopened with the plasma torch in either non-transferred or transferred mode.

Thus, the present invention provides a nozzle design that forms a transition between a molten, flowable material within a PACT system and its discharge therefrom into a slag mold. The nozzle designs of the present invention help prevent slag build-up and throat closure within the nozzle. Furthermore, the method of the present invention allows for reforming of the nozzle opening with molten material and refractory material, thus improving the life of the nozzles. The improvement in materials combined with the molten slag and the design of the nozzle has increased the life of the throat and decreased throat closure thereby enhancing the operational characteristics of the PACT system. The increased inside diameter of the lower part of the nozzle minimizes throat closure. The nozzle designs, combined with the described operational techniques for the PACT system, permit to reforming the throat orifice after erosion by solidifying processed material in the eroded areas.

The surface geometry of pour nozzle 20b with groove 50 and optional cone-shaped approach to orifice 32b helps maintain slag mobility during a pour thereby increasing the life of the throat by further reducing throat closure.

Although the invention has been described with reference to specific exemplary embodiments, it will be appreciated that it is intended to cover all modifications and equivalents within the scope of the appended claims.

What is claimed is:

1. A ceramic pour nozzle for a plasma arc centrifugal treatment system, the ceramic pour nozzle comprising a substantially cylindrical orifice section, a generally arch-shaped downwardly-facing surface having a smaller radius than said orifice section, said downwardly-facing surface extending above a plane of a bottom of the orifice section, and a generally cylindrical or frusto-conical section extending below the plane at an inside radius larger than the radius of the orifice section, the downwardly-facing surface being connected to the generally cylindrical or frusto-conical section.

2. The nozzle of claim 1 wherein a top surface thereof includes a substantially frusto-conical upper portion.

3. The nozzle of claim 1 wherein an inside diameter defined by the orifice section increases slightly in a downward direction.

4. The nozzle of claim 1 wherein the ratio of the height of the orifice section of the nozzle to the diameter of the orifice section is between one-half and two.

5. The nozzle of claim 3 wherein the ratio of the height of the orifice section to the smallest inside diameter of the orifice section is between one-half and two.

6. The nozzle of claim 1 wherein the ceramic consists primarily of alumina.

7. The nozzle of claim 1 wherein the ceramic consists primarily of alumina and chrome oxide.

8. The nozzle of claim 7 wherein the alumina consists primarily of resin-bonded castable refractory.

9. A plasma arc centrifugal treatment system comprising:
a primary chamber;
a plasma torch extending within the primary chamber;
a centrifuge defining a bottom of the primary chamber;
a slag mold below the centrifuge; and
a ceramic pour nozzle located between the primary chamber and the slag mold, the ceramic pour nozzle being defined within the centrifuge and comprising:
a substantially cylindrical orifice section;
a generally arch-shaped downwardly-facing surface having a smaller radius than said orifice section, said downwardly-facing surface extending above a plane of a bottom of the orifice section; and
a generally cylindrical or frusto-conical section extending below the plane at an inside radius larger than the radius of the orifice section, the downwardly-facing surface being connected to the generally cylindrical or frusto-conical section.

10. The plasma arc centrifugal pour treatment system of claim 9 wherein a top surface of the nozzle includes a substantially frusto-conical portion.

11. The plasma arc centrifugal treatment system of claim 9 wherein the substanially cylindrical section of the pour nozzle has a slightly increasing diameter as the section extends downwardly.

12. The plasma arc centrifugal treatment system of claim 9 wherein the ratio of the height of the orifice section of the nozzle to the diameter of the orifice section is between one-half and two.

13. The plasma arc centrifugal treatment system of claim 9 wherein the pour nozzle consists primarily of alumina.

14. The plasma arc centrifugal treatment system of claim 9 wherein the pour nozzle consists primarily of alumina and chrome oxide.

15. The plasma arc centrifugal treatment system of claim 9 wherein the alumina consists primarily of resin-bonded castable refractory.

16. The plasma arc centrifugal treatment system of claim 10 wherein substantially horizontal grooves are defined within the top surface of the pour nozzle that are in fluid communication with the orifice section.

* * * * *